United States Patent
Singh

(10) Patent No.: US 10,074,136 B2
(45) Date of Patent: Sep. 11, 2018

(54) METHOD AND APPARATUS FOR PUBLISHING MARKET INFORMATION

(75) Inventor: Inderdeep Singh, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 419 days.

(21) Appl. No.: 13/355,092

(22) Filed: Jan. 20, 2012

(65) Prior Publication Data

US 2013/0166427 A1 Jun. 27, 2013

Related U.S. Application Data

(60) Provisional application No. 61/579,811, filed on Dec. 23, 2011.

(51) Int. Cl.
*G06Q 40/00* (2012.01)
*G06Q 40/06* (2012.01)
*G06Q 50/00* (2012.01)

(52) U.S. Cl.
CPC .............. *G06Q 40/06* (2013.01); *G06Q 50/00* (2013.01)

(58) Field of Classification Search
CPC ......... G06Q 40/04; G06Q 40/06; G06Q 40/00
See application file for complete search history.

(56) References Cited

U.S. PATENT DOCUMENTS

| | | | |
|---|---|---|---|
| 7,194,468 B1 | 3/2007 | Bacila et al. | |
| 7,552,077 B1 | 6/2009 | Schluetter et al. | |
| 7,567,930 B1 | 7/2009 | Schluetter et al. | |
| 7,624,063 B1 | 11/2009 | Andrews | |
| 7,685,049 B1 | 3/2010 | Singer | |
| 7,747,513 B2 | 6/2010 | Duquette et al. | |
| 7,783,558 B1 | 8/2010 | Schwarz et al. | |
| 2008/0077653 A1* | 3/2008 | Morris | 709/203 |
| 2008/0279143 A1* | 11/2008 | Lee et al. | 370/329 |
| 2009/0327545 A1 | 12/2009 | Litovtchenko et al. | |
| 2011/0270732 A1* | 11/2011 | Ritter et al. | 705/37 |
| 2013/0006841 A1* | 1/2013 | Singer | 705/37 |
| 2013/0166427 A1 | 6/2013 | Singh | |

OTHER PUBLICATIONS

T. M. Choi et al., Optimal Two-Stage Ordering Policy with Bayesian Information Updating, The Journal of the Operational Research Society, vol. 54, No. 8 (Aug. 2003), pp. 846-859.*

Bill Dupor and Takayuki, Sticky information: The Impact of Different Information Updating Assumptions, Journal of Money, Credit and Banking, vol. 37, No. 6 (Dec. 2005), pp. 1143-1152.*

Jiri Chod and Nils Rudi, Strategic Investments, Trading, and Pricing under Forecast Updating, Management Science, vol. 52, No. 12 (Dec. 2006), pp. 1913-1929.*

(Continued)

*Primary Examiner* — Virpi H Kanervo
(74) *Attorney, Agent, or Firm* — Lempia Summerfield Katz LLC

(57) ABSTRACT

A method and apparatus for publishing market data for a financial instrument utilizes existing network layer acknowledgement feature to publish market data for the financial instrument to a client device at rates in which the client device is able to process the data. The publishing rate is dynamic, as opposed to being fixed, and is able to adjust "on-the-fly" so as to prevent message queue stagnation.

15 Claims, 6 Drawing Sheets

(56) References Cited

OTHER PUBLICATIONS

Lockwood, et al., "A Low-Latency Library in FPGA Hardware for High-Frequency Trading (HFT)", 2012 IEEE 20th Annual Symposium on High-Performance Interconnects, 2012, 8 pages.
Wikipedia, "TCP Congestion—Avoidance Algorithm", http://en.wikipedia.org/wiki/TCP_congestion-avoidance_algorithm, accessed Apr. 16, 2014, 6 pages.
Information Sciences Institute, Transmission Control Protocol, DARPA Internet Program Protocol Specification, Sep. 1981.
M. Allman, TCP Congestion Control, Sep. 2009.
Matthew Roughan, TCP Flow Controls, 1999.
European Search Report, from EP Application No. 15173793.9, dated Nov. 17, 2015, EP.
Rosenband, "A Remote Procedure Call Library", retrieved from the internet: http://web.mit.edu/6.033/1997/reports, retrieved Feb. 11, 2009.

\* cited by examiner

METHOD AND APPARATUS FOR PUBLISHING MARKET INFORMATION

REFERENCE TO PRIOR FILED APPLICATION

This application claims priority to U.S. Provisional Patent Application No. 61/579,811, filed Dec. 23, 2010, and entitled "Method and Apparatus for Publishing Market Information".

FIELD OF THE INVENTION

The present invention is generally directed to trading of financial instruments. More particularly, the invention is directed to a method and apparatus for facilitating the trading of a financial instrument by publishing market information to a receiving device at a rate commensurate with the rate at which the receiving device can process the market information.

BACKGROUND OF THE INVENTION

In the high stakes world of electronic trading, a well-informed trader is more likely to be a profitable trader. Traders in electronic markets depend on accurate and current market information in order to make informed trading decisions. This is especially true for traders who engage in high-frequency algorithmic trading where market opportunities can be extremely brief.

Market information is typically delivered or communicated to the trader by subscribing to one or more markets. For example, a trader may subscribe to receive live market information and updates for equities traded on the NYSE. The CME also provides market data on a subscription basis to traders interested in futures. Regardless of the source, the ability of the exchange to provide accurate and current market data to the trader's client device is vital to maintaining a profitable trading strategy.

Market information typically includes the current Best Bid and Best Ask (sometimes referred to as the inside market). Market depth, which generally includes Bid and Ask quantities at varying price levels that are available in the market, may also be included in the market information available from the exchanges. Market depth can be any number of price levels deep and is typically limited to some extent by the exchange in order to accommodate bandwidth issues. Market depth and pricing are not the only types of market information offered by exchanges. Exchanges may offer a wide variety of other market information types, including last traded price, last traded quantity, net change, and total volume.

Market information data feeds can contain an enormous amount of data. This is especially true in markets having a high level of liquidity where changes to the order book can occur at a high rate. While traders generally benefit from receiving as much information as possible, network limitations on the trader's end can cause the processing capacity of the trader's system to be overwhelmed and unable to properly process massive amounts of market information updates.

Measures have been taken to address the issue, but each suffers from drawbacks. In one approach, the most current market data is always sent to the trader/client device at a predetermined time interval. While this approach generally does well in keeping the market data pipeline from becoming clogged, it is inflexible and often prevents market data from being delivered to the trader in a timely manner. If a market update is sent by the exchange at the beginning of the time interval, the trader is forced to wait until the end of the time interval before receiving the new market information.

Another approach is to send a market update to the trader client each time there is a change to a market data parameter, such as a change to the inside market or the book depth. While this approach provides a quicker response to market changes, problems arise when market changes occur rapidly. As the amount of incoming market data surpasses the trader's network bandwidth, market updates are queued and published in a first in, first out manner. As the queue grows, so too does the latency of the market data being published to the trader client.

What is needed, therefore, is a more effective way to publish market information to a trader's client device.

SUMMARY OF THE INVENTION

The present invention can be summarized as a computer-implemented method for publishing market information relating to a financial instrument that is received from a financial market center and published to a client device over an electronic network. The network device receives a market information feed from the market center that contains current market information for a financial instrument. Current market information received from the market information feed is stored and an electronic communication link, such as a TCP link, is established between a network device and a client device. The electronic communication link is configured to provide a feedback signal or other form of acknowledgement to the network device to inform the network device when the client device is ready to receive market information. Market information is published to the client device when the feedback signal indicates the client device is ready to receive market information.

The above method operates to ensure that no market information is published to the client device unless the client device is able to process it. This results in a situation where multiple market updates may be received between publishings. In one embodiment of the method, only the most current market information update is published to the client device.

In a further aspect of the method, an indicator is set to indicate when a market update has been stored and is ready to be published. When the feedback signal indicates the client device is ready to receive market information, the indicator is checked and if it is set, the current market information is published to the client device.

Market information may be stored in the form of a market book representing offers to buy and offers to sell the financial instrument at a plurality of prices. In this embodiment, when current market information is published to the client device, the entire market book is preferably published.

The present invention also provides an apparatus for publishing market information in accordance with the above described method.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawing (which are not to scale) where:

DETAILED DESCRIPTION OF THE PREFERRED EMBODIMENT

A need in the art is fulfilled as described herein whereby market data for a tradable financial instrument is published to a trader in a manner that prevents the trader's client device from being overwhelmed with, and unable to adequately process, market data, even in highly liquid markets. Publishing of market data according to a method implemented within a computing system as described below also eliminates latency by ensuring that the market data being processed by the client device is current.

Figure 1:
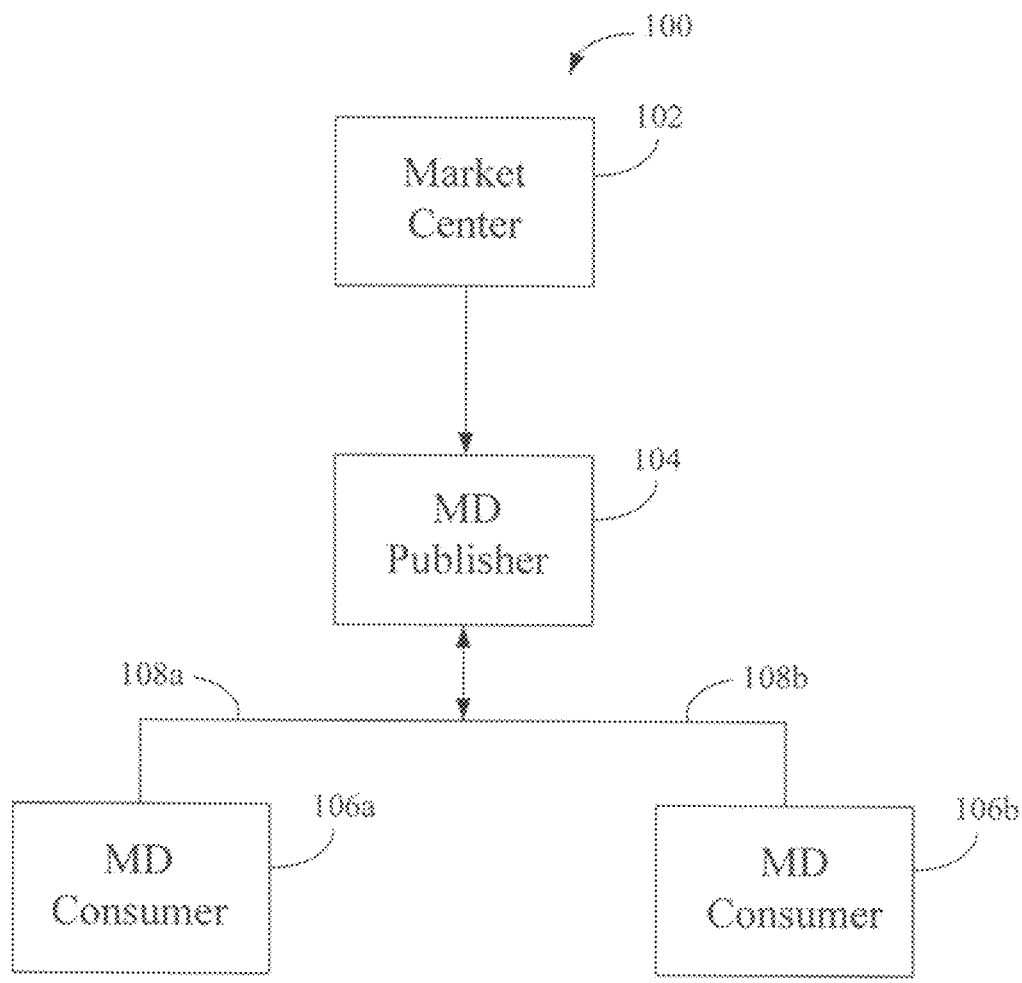
FIG. 1 is a block diagram of a computer-implemented apparatus in which market data for tradable financial instruments may be published to a trader client device.

Turning now to the drawings wherein like reference characters indicate like or similar parts throughout, FIG. 1 shows a computer-implemented apparatus, or computing system 100 suitable for publishing market data/information sent by an exchange or other market center 102 (such as the CME, NYSE, etc.) to a trader client device/market date consumer 106a, 106b. Market data is received by a market data publisher 104, which may be included as part of a local network having a market data gateway or bridge or other component operable to publish the market data to one or more consumer devices 106a, 106b over a feedback oriented network layer. As is known in the art, a network layer is a combination of firmware and hardware that facilitates the sending and receiving of data over a physical network of links and switches. For the consumer network layer, it is noted that certain network layer types, such as a TCP network layer, have a built-in ability to enable a slow consumer to provide feedback to a fast data producer at the link level. The present invention takes advantage of such network layer capability by sending market data to the consumer device 106a, 106b only when the consumer device 106a, 106b is able to process the data while providing only the most recent market data to the consumer device 106a, 106b, as more fully described below.

The amount of market data sent by a market center 102 will depend on many dynamics. Market data can be subscribed to on a number of levels with each level representing a different type and/or amount of data to be sent. In addition, market activity can fluctuate significantly for different tradable instruments. When market data volumes begin flowing at rates that exceed what can be delivered to and consumed by the client device 106a, 106b, internal message queues can grow to the point where the market data is unusable due to its latency. In worst case scenarios, market data can actually backlog to the point that there is a failure in the ability to deliver any useful data to the consumer device 106a, 106b.

Market data publishing involves compressing the market data into a format that is more easily moved to and used by the consumer device 106a, 106b. The market data is serialized at the publisher 104 and sent out over a connection 108a, 108b to the consumer device 106a, 106b where it is then de-serialized for processing by the consumer device 106a, 106b.

Unlike prior approaches that publish market data at a hard-coded fixed rate regardless of whether the consumer device 106a, 106b is capable of processing the data at the rate of publishing, the apparatus 100 operates to ensure that market data sent by the market center 102 does not overwhelm the ability of the consumer device 106a, 106b to use/process that data. This is accomplished by configuring the apparatus 100 to publish the market data to the consumer device 106a, 106b at a rate commensurate with the rate at which the consumer device 106a, 106b can process the data.

The capacity of the network between the client device 106a, 106b and the market data publishing server (or other component of the publisher 104 responsible for publishing market data to the client device 106a, 106b) determines the rate at which published market data is processed or utilized by the client device 106a, 106b and, accordingly, the rate at which the market data will be published. As the demands on the network change, the rate at which market data is published will increase or decrease accordingly.

Thus, the rate at which market data is published to the client device 106a, 106b is dynamic and adaptive and can be said to "adjust on the fly." This is accomplished by configuring the market data publisher 104 and its connection 108a, 108b to each consumer device 106a, 106b in a way that allows the publisher 104 to know when the consumer device 106a, 106b has processed the most recent market data it has received and is ready to receive new market data. This mechanism is performed at the network hardware level at high speed to prevent it from becoming a bottleneck to the publishing process.

For example, in a preferred embodiment, connections 108a, 108b are point-to-point TCP (Transmission Control Protocol) connections, which have a built-in acknowledgment feature that enables the publisher 104 to receive an acknowledgment, or ACK, to indicate when the consumer device 106a, 106b is ready to receive new market data. The publisher 104 is further illustrated in FIG. 2 where publisher 104 receives market data from market center 102 (FIG. 1) at input 202. Publisher 104 utilizes two threads of operation—a book builder thread 206 (shown as part of a book builder 204) which places market data for a particular financial instrument into a market book 208 representing offers to sell and offers to buy the financial instrument at a plurality of prices, and a publisher thread 212 which publishes market data (preferably the entire book) at output line 214. In operation, when the publisher 104 receives a market data update at line 202, the market data update is added to the book 208 by the book builder thread 206 and a "new data" flag or other form of indicator 210 is set to indicate that new market data is available for publishing to the client device 106a, 106b. However, the market data update is not immediately published to the client device 106a, 106b. Nor is the market data update published to the client device 106a, 106b after a set time interval. Rather, the new market data update is only published to client device 106a, 106b when the client device 106a, 106b is ready to process the update. When a client device 106a, 106b is ready to receive new data as indicated by a network level ACK, publisher 104 will check flag 210. If flag 210 is set, the book 208 is serialized to the output line 214 by the publisher thread 212 where it is sent to the client device 106a, 106b for processing. Access to the book 208 is locked at all times to ensure that only one of either the book builder thread 206 or the publisher thread 212 can access the book 208 at any point in time.

In the event a subsequent market data update is received by the publisher 104 while flag 210 is set, it is preferable that the subsequent market data update replace the corresponding market data that was contained in the book 208 immediately prior to receiving the subsequent market data update. This ensures that when the client device 106a, 106b is ready to receive new market data, the book 208 that is sent to the client device 106a, 106b will contain only the most recent market data. Alternatively, new market data updates may be added to the book 208 without eliminating old market data.

Figure 2:
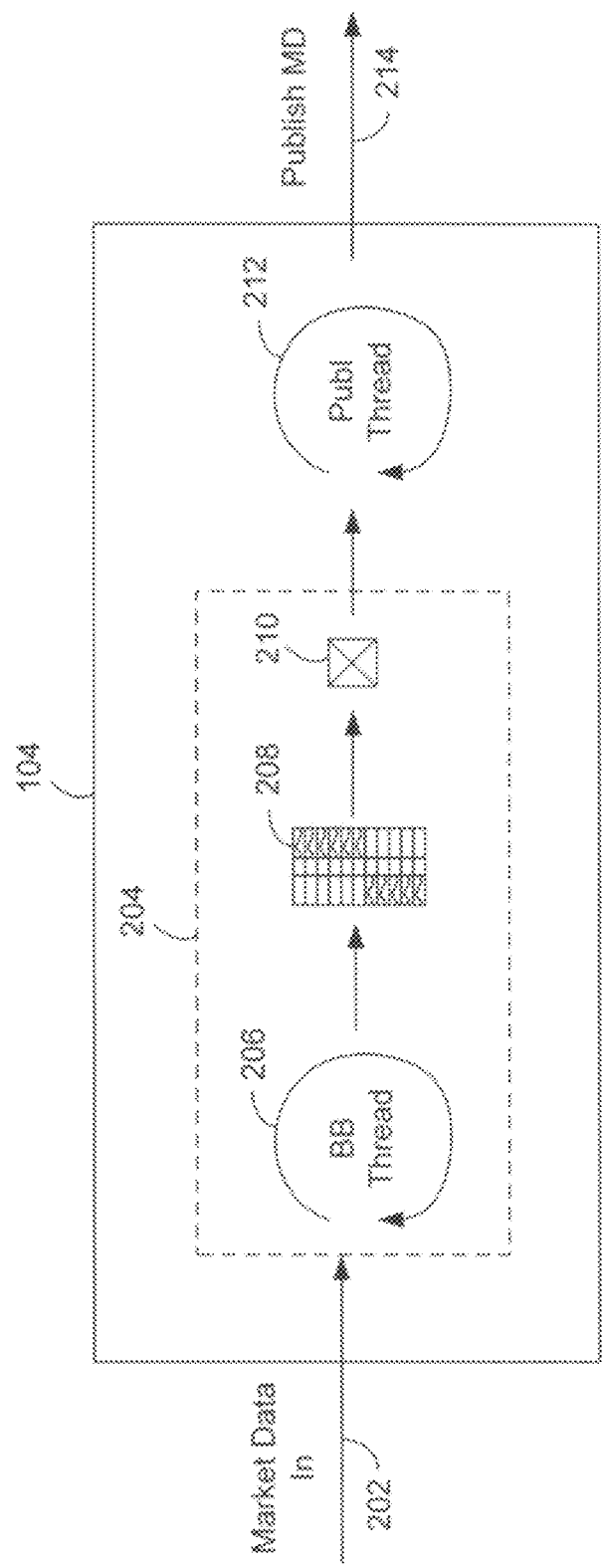
FIG. 2 is a block diagram of an adaptive market information publisher depicting bookbuilder and publisher threads of operation.
Figure 3:
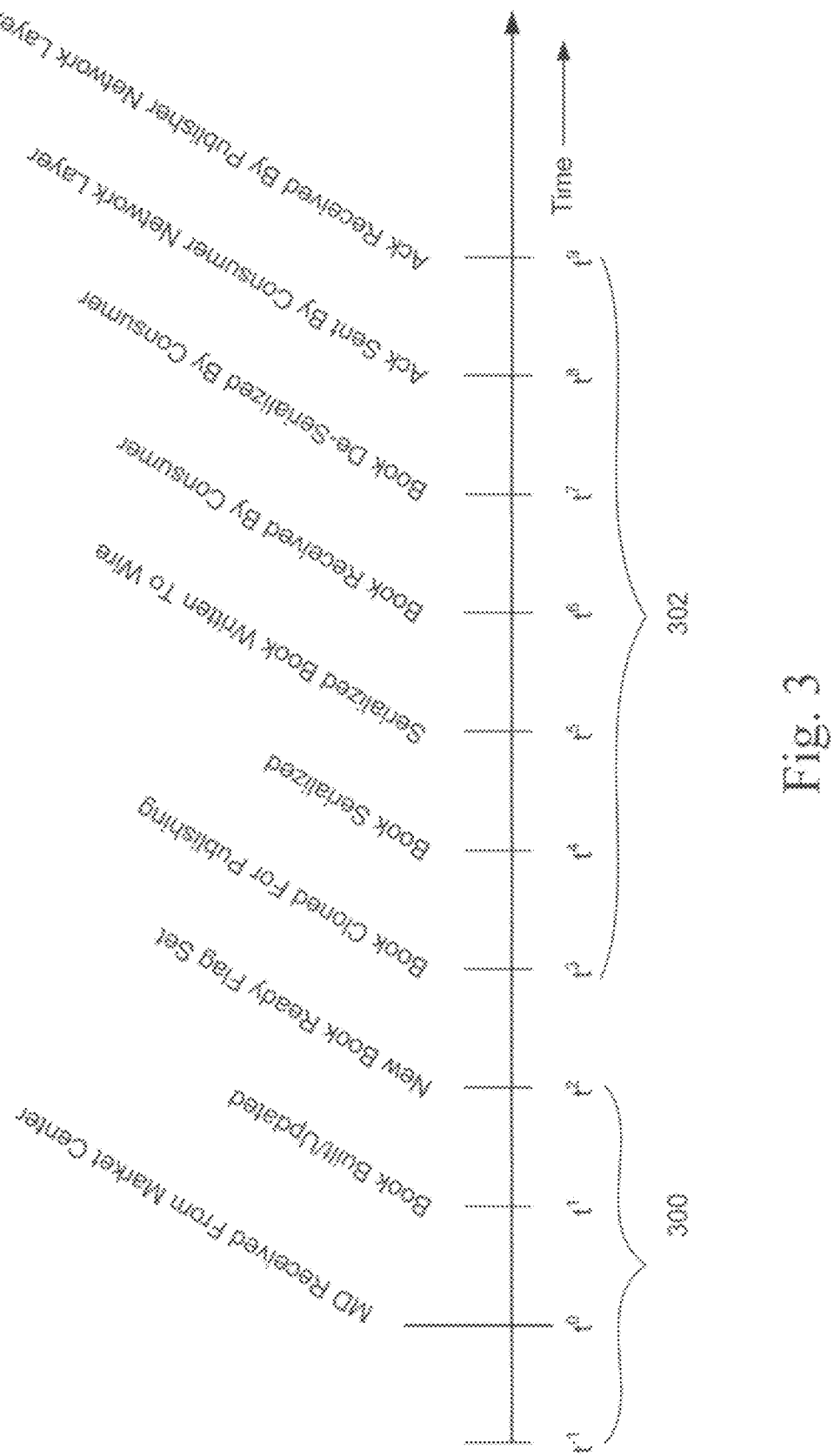
FIG. 3 is a timing diagram representing an embodiment of the bookbuilder and publisher sequence of operations.

FIG. 3 shows a generalized timeline for publishing market data for a financial instrument according to a preferred sequence of events, where the time period $t^0$ through $t^2$ 300 represents a process being carried out by the book builder 204 of FIG. 2 and the time period $t^3$ through $t^9$ 302 represents a process being carried out by the publisher thread 212. By time $t^0$, market data is received from the exchange or other market center and the received market data is used to build and update a market book for the financial instrument by time $t^1$. After the market data is added to the book, a market data ready flag is set at time $t^2$ to indicate that new market data is ready to be published. If new market data is received after the flag is set, process 300 is repeated with the new market update replacing the corresponding existing market data in the book.

By time $t^3$, the client device is ready to receive the book and the book is cloned for publishing. The book is serialized by time $t^4$ and the serialized book is written to the wire (output line 214 in FIG. 2) by time $t^5$. The book is received by the client device by time $t^6$ and de-serialized for use by the client device by time $t^7$. An acknowledgement (ACK) is sent by the client network layer by time $t^8$ and received by the publisher network layer by time $t^9$ to complete the sequence.

Figure 4A:
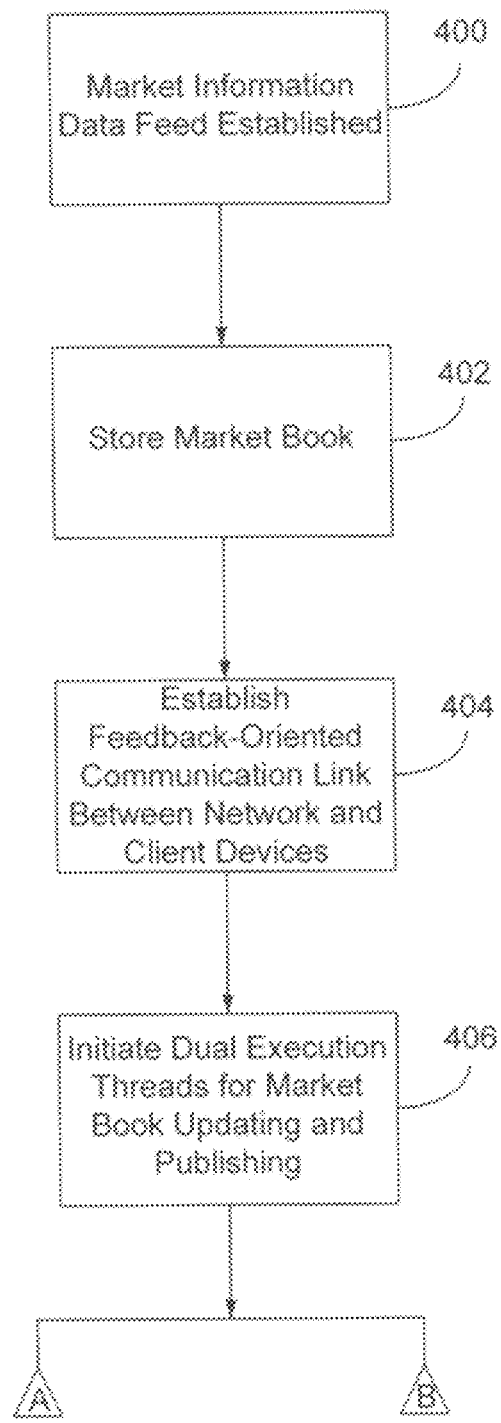
FIGS. 4A-4C, collectively, are a flow diagram of a method for adaptively publishing market information received from a market center to a client device.
Figure 4B:
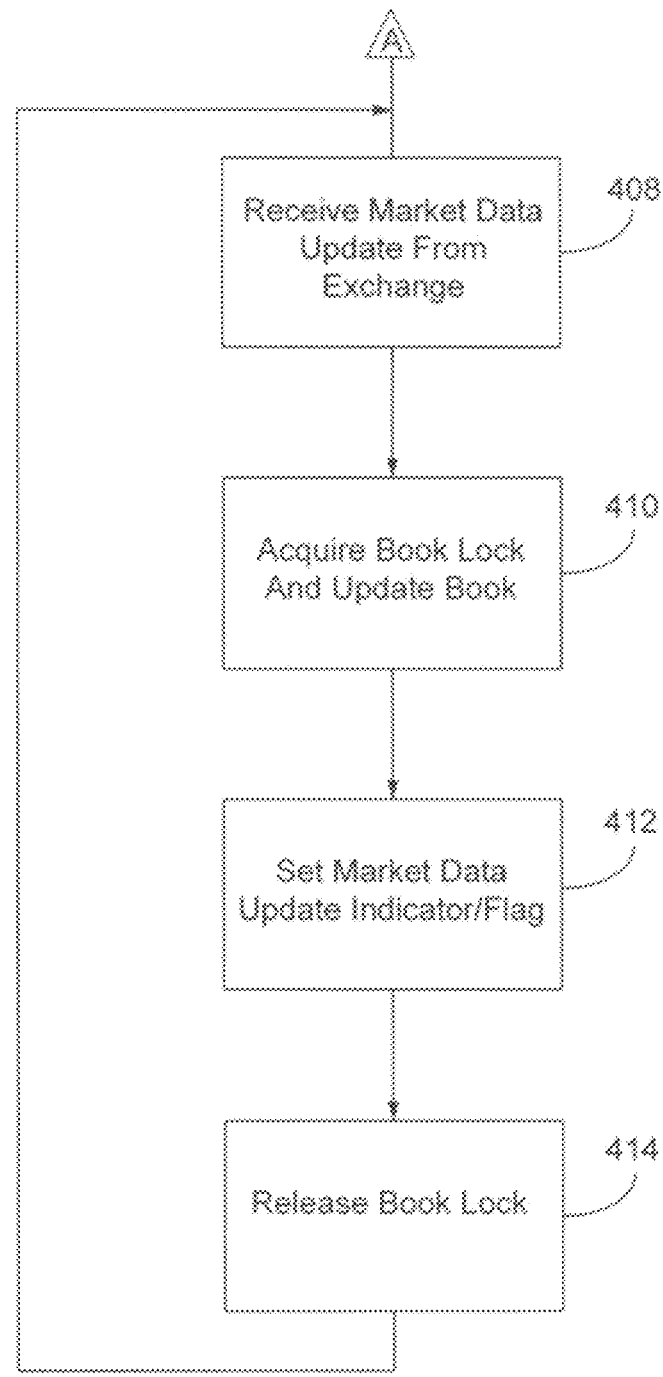
Figure 4C:
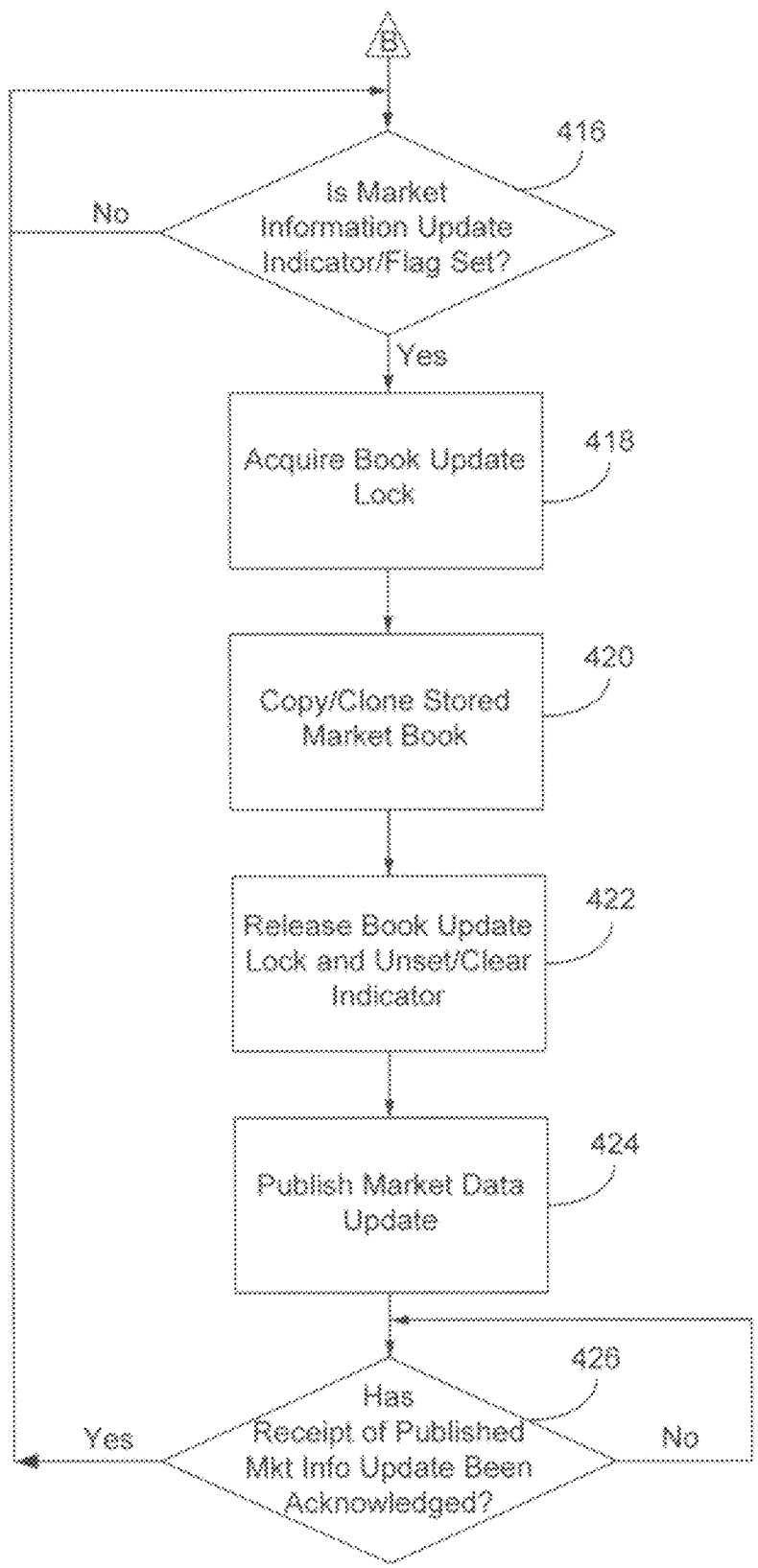

A more detailed flowchart for the market data publishing method and apparatus described herein is shown in FIGS. 4A-C. At block 400, a market information feed (such as a data feed from an exchange) is established. The first market data received upon initiation of the process will be used to build and store a market book 402 within an electronic memory that is preferably internal to the computing system. A feedback oriented electronic communication link (such as Transmission Control Protocol, or TCP link) is established between a network device configured to receive and publish the market data and one or more client devices 404. The electronic communication link is configured to provide a feedback signal or other indication to the network device to inform the network device when a client device is ready to receive market information. Dual threads of execution—one for market book updating and one for client device publishing—are initiated at block 406.

For the market book updating/book building thread, a market data update is received from the exchange or market center at block 408. The market book is then locked to prevent publishing during updating of the book while the book is updated at block 410, and a market data update indicator/flag is set at block 412. Once the market book has been updated, the book lock is released 414 and the book building/updating process returns to block 408 and awaits receipt of the next market data update.

For the client device publishing thread, the process continually checks to see whether the market information update indicator/flag has been set 416. When it is determined that the flag is set, the book is locked 418 to prevent the book building thread from updating the book while it is in the process of being published. At block 420, the stored market book is copied/cloned and the book lock is released at block 422 to enable the book builder to again make updates to the book as new market data is received from the market center. The market data update/cloned book is published at block 424 and the process then waits at block 426 for a network layer ACK to indicate that the client device has processed the new book and is ready to receive new market data updates. When the ACK is received, the process returns to block 416.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. A method implemented within a computing system for publishing data indicative of current market information relating to a financial instrument received from a financial market center to a client device over an electronic network, the method comprising:

receiving, via the electronic network by a network device of the computing system from a financial market center a market information data feed containing data indicative of current market information for the financial instrument;

storing with the computing system in an electronic memory coupled therewith, the received data indicative of current market information;

establishing with the computing system an electronic communication link between the network device and a client device via the electronic network, said electronic communication link being configured to determine when the client device is ready for receiving market information based on receipt thereby of previously transmitted data and provide a feedback signal to the network device via the electronic network indicative of the receipt of the previously transmitted data and for informing the network device when the client device is ready to receive market information;

receiving, via the electronic network by the network device of the computing system from the financial market center, the market information data feed containing updated data indicative of current market information for the financial instrument:

storing with the computing system in the electronic memory coupled therewith, the received updated data indicative of current market information; and publishing, with the computing system, the stored data indicative of current market information to the client device when, based on the receipt of the feedback signal prior to the receipt of the updated data indicative of current market information, the electronic communication link has determined that the client device is ready to receive market information, and the stored updated data indicative of current market information to the client device when, based on the receipt of the feedback signal subsequent to the receipt of the updated data indicative of current market information, the electronic communication link has determined that the client device is ready to receive market information, wherein the publishing comprises serializing, by the computing system, the stored data or stored updated data indicative of current market information for transmission to the client device via the electronic network and transmitting, by the computing system, the serialized data or updated data indicative of current market information to the client device via the electronic network.

2. The method of claim 1, wherein said electronic communication link is a Transmission Control Protocol (TCP) communication link that provides a feedback signal in a form of a network layer acknowledgment (ACK) when the client device is ready to receive market information.

3. The method of claim 1, wherein said step of storing the received updated data indicative of current market information further includes replacing the stored data indicative of current market information stored in the electronic memory with the receive updated data indicative of current market information.

4. The method of claim 1, further comprising:
setting with the computing system an indicator when the data and updated data indicative of current market information has been stored; and
checking with the computing system whether the indicator is set when the feedback signal indicates the client device is ready to receive market information; and
if the indicator is set, publishing with the computing system the stored data or updated data indicative of current market information when the feedback signal indicates the client device is ready to receive market information.

5. The method of claim 1, wherein the data and updated data indicative of current market information is stored in a form of a market book representing offers to sell and offers to buy the financial instrument at a plurality of prices.

6. The method of claim 5, wherein said market book is published to the client device when the client device is ready to receive market information.

7. A method implemented within a computing system for publishing data indicative of current market information relating to a financial instrument received from a financial market center to a client device over an electronic network, the method comprising:
(a) receiving, via the electronic network, at a network device of the computing system a market information data feed from a financial market center containing data indicative of current market information for a financial instrument;
(b) storing with the computing system in an electronic memory coupled therewith, the received data indicative of current market information for the financial instrument in a market book representing offers to sell and offers to buy the financial instrument at a plurality of prices;
(c) establishing with the computing system an electronic communication link via the electronic network, between the network device and a client device that is ready to receive market information, whereby electronic communication between the network device and the client device occurs according to a feedback-oriented communication protocol implemented by the electronic communication link that determines when the client device is ready to receive market information based on receipt thereby of previously transmitted data and, based thereon, provides an acknowledgement signal via the electronic network when the client device receives market information from the network device informing the network device when the client device is ready to receive market information;
(d) receiving at the network device via the market information data feed data indicative of one or more market information updates for the financial instrument;
(e) storing with the computing system in an electronic memory coupled therewith the received data indicative of the one or more market information updates wherein any previously stored data for the financial instrument is overwritten in the electronic memory;
(f) in response to storing the data indicative of one or more market information updates, setting with the computing system a market update indicator to indicate that a market information update is available;
(g) upon determining with the computing system that the market update indicator is set:
publishing with the network device the data indicative of one or more market information updates to the client device via the communication link by serializing, by the computing system, the stored data indicative of one or more market information updates for transmission to the client device via the electronic network and transmitting, by the computing system; the serialized data to the client device via the electronic network:
in response to publishing the one or more market information updates, resetting with the computing system the market update indicator to indicate that no market update is available; and
setting with the computing system the market update indicator to indicate that a market information update is available when any new market information update is received during publishing;
(h) receiving at the network device via the communication link an acknowledgement that the data indicative of one or more market information updates have been received; and
(i) in response to receiving said acknowledgement, determining with the computing system whether the market information update indicator is set:
(j) if the market information update indicator is set to indicate that a market information update is available, repeating steps (g) through (i), and
(h) if the market information update indicator is not set to indicate that a market information update is available, repeating steps (d) through (i),
wherein no new market information updates are published until publishing of said one or more market updates is complete and the client device is ready to receive new market information updates.

8. The method of claim 7, wherein said electronic communication link is a Transmission Control Protocol (TCP) communication link that provides a feedback signal in a form of a network layer acknowledgement when the client device is ready to receive market information.

9. The method of claim 7, wherein the data indicative of market information updates are stored in the market book representation for the financial instrument.

10. The method of claim 9, wherein the network device publishes the entire market book representation containing the market information updates to the client device.

11. The method of claim 7, wherein the data indicative of market information updates are stored in the market book representation.

12. The method of claim 11, further comprising:
locking the market book representation when a market information update is being stored to prevent publishing of the stored market information while the market book representation is being updated; and
unlocking the market book representation to enable publishing of the stored market information when the storing of market information update is complete.

13. An apparatus for publishing data indicative of market information relating to a financial instrument received from a financial market center to a client device over an electronic network, the apparatus comprising:
- a market data publisher configured to publish data indicative of market information, received via the electronic network from a market information data feed generated by the financial market center, to a client device upon receipt of a feedback signal indicating that the client device is ready to receive market information, said market information data feed containing current market information for a financial instrument;
- an electronic memory configured to store data indicative of current market information received by the market data publisher via the market information data feed updating previously received data indicative of current market information that has not yet been transmitted to the client device; and
- an electronic communication link configured to link the market data publisher with the client device, the electronic communication link further configured to determine when the client device is ready to receive market information based on receipt thereby of previously transmitted data and, based thereon, provide the feedback signal to the market data publisher indicative of the receipt of the previously transmitted data and inform the market data publisher when the client device is ready to receive market information;
- upon receipt of the feedback signal, the market data publisher configured to serialize the stored data indicative of current market information for transmission to the client device via the electronic network; and
- the market data publisher configured to transmit the serialized data indicative of current market information to the client device via the electronic network.

14. The apparatus of claim 13, wherein said electronic communication link is a Transmission Control Protocol (TCP) communication link that provides a feedback signal in a form of a network layer acknowledgment (ACK) when the client device is ready to receive market information.

15. The apparatus of claim 13, wherein market information is stored and published by the market data publisher in a form of a market book representing offers to sell and offers to buy the financial instrument at a plurality of prices.

* * * * *